United States Patent
Würz et al.

(10) Patent No.: US 11,536,334 B2
(45) Date of Patent: Dec. 27, 2022

(54) FRICTION LINING HOLDING SPRING FOR IMPROVED BRAKE PISTON FIXING

(71) Applicant: Continental Teves AG & Co. oHG, Frankfurt am Main (DE)

(72) Inventors: Matthias Würz, Frankfurt am Main (DE); Stefanie Weise, Frankfurt am Main (DE); Norbert Leidecker, Frankfurt am Main (DE); Jens Adam, Frankfurt am Main (DE); Martin Klacik, Frankfurt am Main (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 35 days.

(21) Appl. No.: 16/630,929

(22) PCT Filed: Jul. 24, 2018

(86) PCT No.: PCT/EP2018/070055
§ 371 (c)(1),
(2) Date: Jan. 14, 2020

(87) PCT Pub. No.: WO2019/020636
PCT Pub. Date: Jan. 31, 2019

(65) Prior Publication Data
US 2020/0232528 A1 Jul. 23, 2020

(30) Foreign Application Priority Data

Jul. 28, 2017 (DE) ...................... 10 2017 213 057.1
Nov. 21, 2017 (DE) ...................... 10 2017 220 789.2

(51) Int. Cl.
*F16D 65/40* (2006.01)
*F16D 65/00* (2006.01)
*F16D 65/097* (2006.01)

(52) U.S. Cl.
CPC ...... *F16D 65/0006* (2013.01); *F16D 65/0971* (2013.01); *F16D 65/0979* (2013.01); *F16D 2200/0021* (2013.01)

(58) Field of Classification Search
CPC ............. F16D 65/0006; F16D 65/0971; F16D 65/0979; F16D 65/092
(Continued)

(56) References Cited

U.S. PATENT DOCUMENTS 4,609,077 A * 9/1986 Nakatsuhara ......... F16D 55/227
188/250 E
5,494,140 A * 2/1996 Weiler ................. F16D 65/0006
188/250 B
(Continued)

FOREIGN PATENT DOCUMENTS

CN    203176229 U    9/2013
CN    103912608 A    7/2014
(Continued)

OTHER PUBLICATIONS

Japanese Office Action for Japanese Application No. 2019-571618, dated Dec. 28, 2020, with English summary, 8 pages.
(Continued)

*Primary Examiner* — Christopher P Schwartz
(74) *Attorney, Agent, or Firm* — RatnerPrestia

(57) ABSTRACT

A friction lining holding spring and the equipped component/assembly, specifically a motor vehicle disc brake lining, including the friction lining holding spring. The friction lining holding spring includes an offset knee piece of a U-spring leg, which branches off at an angle from a largely flat U base section, and wherein the largely flat base section has a fastening tab with a cup-shaped rim hole including a through-opening for the purpose of fixing on a backplate of the friction lining, wherein each knee piece has integrated
(Continued)

gearing, which is in particular designed as an uneven brake piston insertion trajectory such that, when a brake piston is inserted, there is a predefined gearing reduction effect for the purpose of automatically influencing or modelling the necessary force requirement.

18 Claims, 4 Drawing Sheets

(58) Field of Classification Search
USPC ....... 188/73.36–73.38, 205 A, 250 B, 250 E, 188/250 G
See application file for complete search history.

(56) References Cited

U.S. PATENT DOCUMENTS

| | | | |
|---|---|---|---|
| 5,860,495 A | 1/1999 | Weiler et al. | |
| 6,634,469 B2* | 10/2003 | Storzel | F16D 65/097 188/205 A |
| 8,806,755 B2 | 8/2014 | Kim | |
| 2002/0096404 A1* | 7/2002 | Storzel | F16D 65/0977 188/73.38 |
| 2009/0108511 A1* | 4/2009 | Bivin | F16F 1/027 267/167 |
| 2016/0053837 A1* | 2/2016 | Lou | F16D 65/0978 188/73.38 |

FOREIGN PATENT DOCUMENTS

| | | | | |
|---|---|---|---|---|
| CN | 205101440 U | 3/2016 | | |
| DE | 7129399 U | 4/1972 | | |
| DE | 4335001 A1 | 4/1995 | | |
| DE | 4340453 A1 | 6/1995 | | |
| DE | 19652933 A1 | 6/1998 | | |
| DE | 19858743 A1 | 6/2000 | | |
| DE | 10031808 A1 | 1/2002 | | |
| DE | 10136235 A1 | 7/2002 | | |
| DE | 10201312238 A1 | 1/2014 | | |
| DE | 102012023427 A1 * | 6/2014 | ........... | H01R 13/114 |
| DE | 102014006954 A1 | 11/2015 | | |
| EP | 0322530 A1 | 7/1989 | | |
| EP | 0580582 A1 | 2/1994 | | |
| EP | 0700486 A1 | 3/1996 | | |
| EP | 0716246 A1 | 6/1996 | | |
| EP | 0989320 A2 | 3/2000 | | |
| GB | 2335955 A * | 10/1999 | ............. | F16D 13/71 |
| JP | 5693529 U | 7/1981 | | |
| JP | 5929432 U | 2/1984 | | |
| JP | 0425627 A | 1/1992 | | |
| JP | 08303499 A | 11/1996 | | |
| JP | 2000213571 A | 8/2000 | | |
| JP | 2007285385 A | 11/2007 | | |
| WO | 9218785 A1 | 10/1992 | | |
| WO | 9429611 A2 | 12/1994 | | |
| WO | 2016120800 A1 | 8/2016 | | |

OTHER PUBLICATIONS

Chinese Office Action for Chinese Application No. 201880052051.5, dated Sep. 30, 2020 with translation, 15 pages.
Din En ISO 1302:Dec. 1993, Geometrical Product Specifications (GPS) Indication of Surface Texture in Technical Product Documentation, 51 pages.
German Examination Report for German Application No. 10 2017 220 789.2, dated Apr. 18, 2018, with partial English translation, 9 pages.
International Search Report and Written Opinion for International Application PCT/EP2018/070055, dated Oct. 25, 2018, 7 pages.
Korean Notification of Reason for Refusal for Korean Application No. 10-2020-7001879, dated May 28, 2021, with translation, 9 pages.
Chinese Office Action for Chinese Application No. 201880052051.5, dated Dec. 14. 2021 with translation, 16 pages.
Brazilian Office Action for Application No. 112020001092-8, dated Sep. 7, 2022 with partial translation, 7 pages.

* cited by examiner

FRICTION LINING HOLDING SPRING FOR IMPROVED BRAKE PISTON FIXING

CROSS REFERENCE TO RELATED APPLICATIONS

This application is the U.S. National Phase of PCT International Application No. PCT/EP2018/070055, filed Jul. 24, 2018, which claims priority to German Patent Application No. DE 10 2017 213 057.1, filed Jul. 28, 2017 and German Patent Application No. DE 10 2017 220 789.2, filed Nov. 21, 2017, the contents of such applications being incorporated by reference herein.

FIELD OF THE INVENTION

The invention relates to a novel friction lining holding spring for a motor vehicle partial-lining disk brake lining and a novel motor vehicle disk brake lining having a friction lining holding spring.

BACKGROUND OF THE INVENTION

It is known in principle to releasably clamp/fix a motor vehicle disk brake lining with the aid of the elastic prestress of a "spring clip" by means of axially oriented plug-in mounting in an inner wall of a pot-shaped actuating member (such as, in particular, a hydraulic brake piston). For this purpose, a (friction lining) holding spring is provided on a backplate of the motor vehicle disk brake lining, said spring resting directly or indirectly, by means of a U base section, on the rear side of the backplate and being fixed permanently thereon, cf. WO 92/18785 A1, WO 94/29611 A1 and DE 101 36 235 A1, each incorporated by reference herein. For the purpose of releasable fixing on the actuating member, the holding spring has two elastically deformable U-spring straps, which are arranged diametrically opposite one another and, after correct push-in mounting in the brake piston, are clamped into the inner wall of the pot-shaped actuating member/brake piston with a defined, radially outward-oriented elastic preloading force.

The friction lining holding springs of the type in question have an offset knee piece on the U-spring strap thereof. One disadvantage of the known arrangement is regarded as the fact that push-in mounting of the friction lining holding spring is considered to be in need of improvement from ergonomic points of view. It is disadvantageous that the force requirement increases progressively as push-in mounting in the interior of the brake piston progresses. The desired improvement should be available with reduced effort, whether mounting is manual or robot-assisted, both at the vehicle brake manufacturer and for the purpose of servicing in the vehicle environment.

SUMMARY OF THE INVENTION

Therefore, an aspect of the present invention is a friction lining holding spring which is easy to use, or a motor vehicle disk brake lining which has a friction lining holding spring and can be mounted in an improved manner, for use in a motor vehicle partial-lining disk brake.

To solve the problem, the proposal according to an aspect of the invention is that each knee piece has an integrated gearing means, which is in particular designed as an uneven brake piston insertion trajectory such that, when a brake piston is inserted, there is a predefined gearing reduction effect for the purpose of automatically influencing or modelling the necessary force requirement. Accordingly, as push-in mounting (feed) of the friction lining holding spring according to an aspect of the invention progresses, automatically adapted force reduction with a gearing effect in accordance with the physical principle of splitting the working force or extending the working travel is made available by means of the insertion trajectory in such a way that the working force requirement at least does not increase progressively as push-in mounting progresses. The two physical measures mentioned (working force splitting, working travel extension) can be embodied jointly (side-by-side) on the knee piece. In particular, the trajectory can produce a correspondingly adapted gearing effect by means of travel extension and/or force component fractions (axial force fraction, radial force fraction) with automatically modified splitting as a result, with the result that, as the mounting feed motion progresses, a reduced, constant or at most linearly increasing push-in force requirement is sufficient to elastically preload the brake piston holding spring. Accordingly, the specific insertion trajectory profile of the knee piece defines the achievable gearing effect or the degree of force relief achieved.

A mounting facilitation measure which can in principle be exploited independently of or in addition to gearing effects envisages that the entire holding spring, the U-spring legs thereof or at least the knee piece is provided with a special surface treatment, at least in the direction of the brake piston inner wall. Inter alia, the surface treatment can comprise a special coating of the holding spring. A particular preference is, for example, to incorporate friction-reducing constituents as an additive into an anticorrosion coating which is applied to the metal surface of the brake piston holding spring. As an alternative, it is possible for an antifriction coating to be additionally applied as a top layer to an anticorrosion coating. Uncoated metal surfaces, in particular, can be advantageously treated if at least the contact surface thereof which is involved is largely free from pores, i.e. is of smoothed design (ground, polished, brushed or the like). It is advantageous here if a groove direction according to DIN ISO EN 1302 (micrograph) is oriented very largely parallel to the mounting push-in direction M of the friction lining holding spring. The reduced-friction surface treatment lowers prevailing contact or sliding friction in contact zones between the brake piston inner wall and the knee piece.

BRIEF DESCRIPTION OF THE DRAWING

Finally, an aspect of the invention defined above is explained by means of various drawings and embodiments, in some cases in comparison with a known holding spring design. In the drawing.

DETAILED DESCRIPTION OF THE PREFERRED EMBODIMENTS

Figure 1:
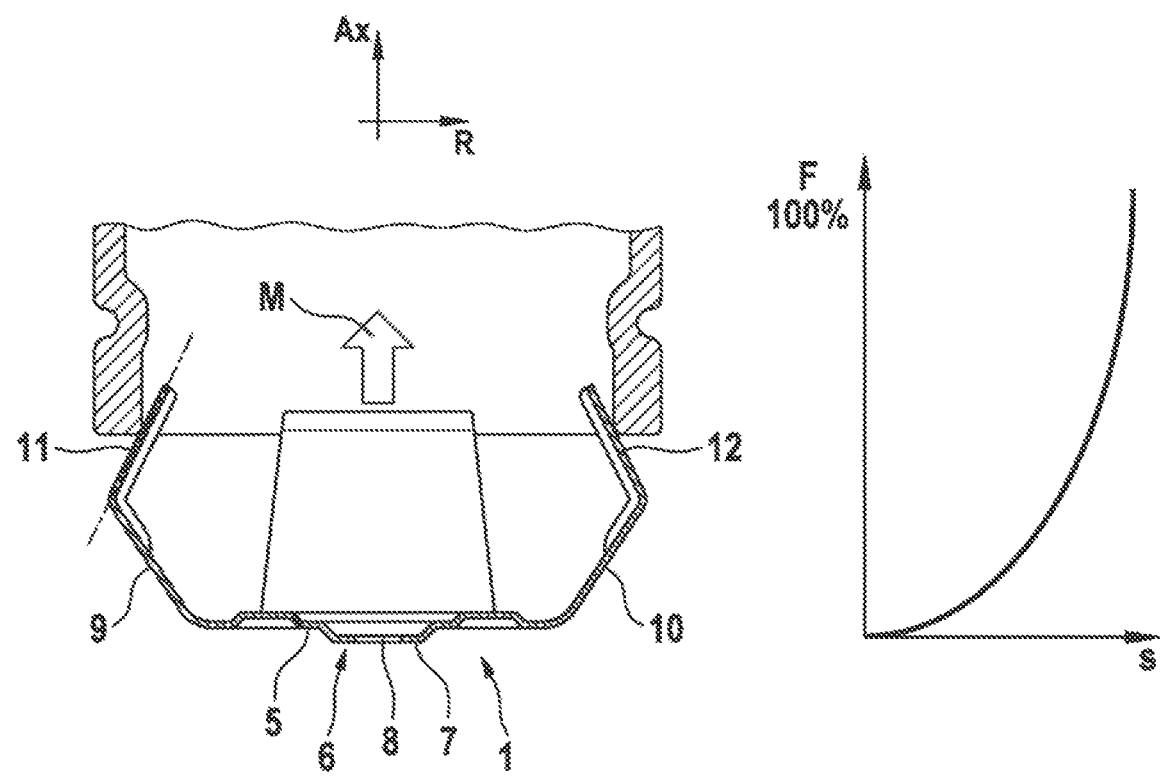
FIG. 1 shows schematically a view and mounting force development of a conventional known friction lining holding spring during the process of insertion into a brake piston.
Figure 2:
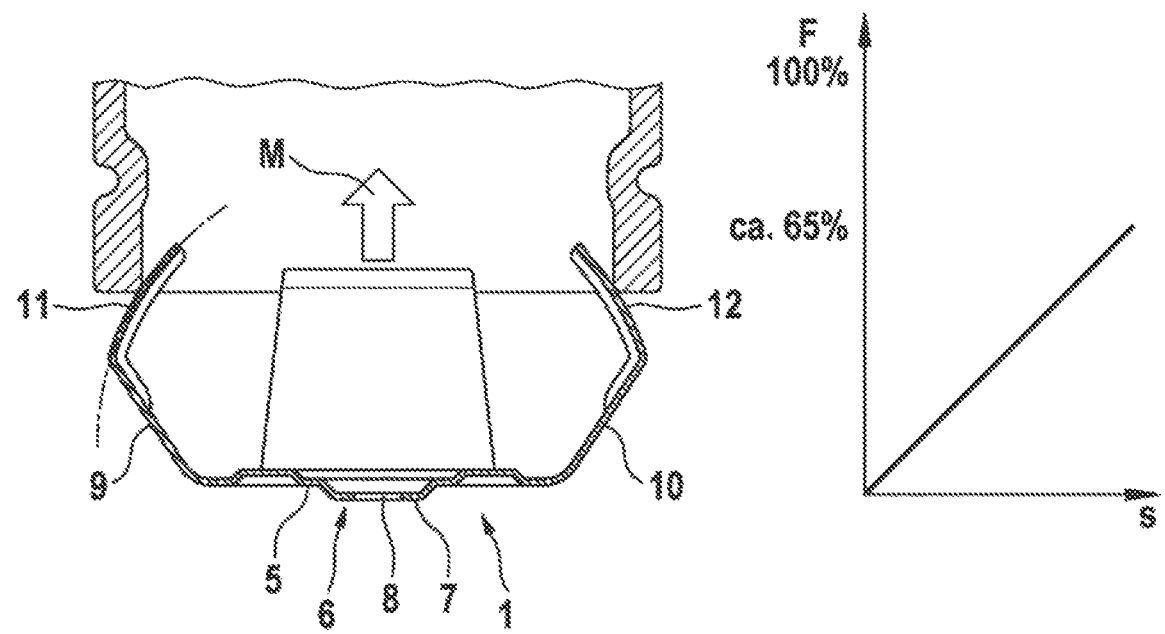
FIG. 2 shows schematically a view and mounting force development of a preferred embodiment of a friction lining holding spring according to an aspect of the invention.
Figure 3:
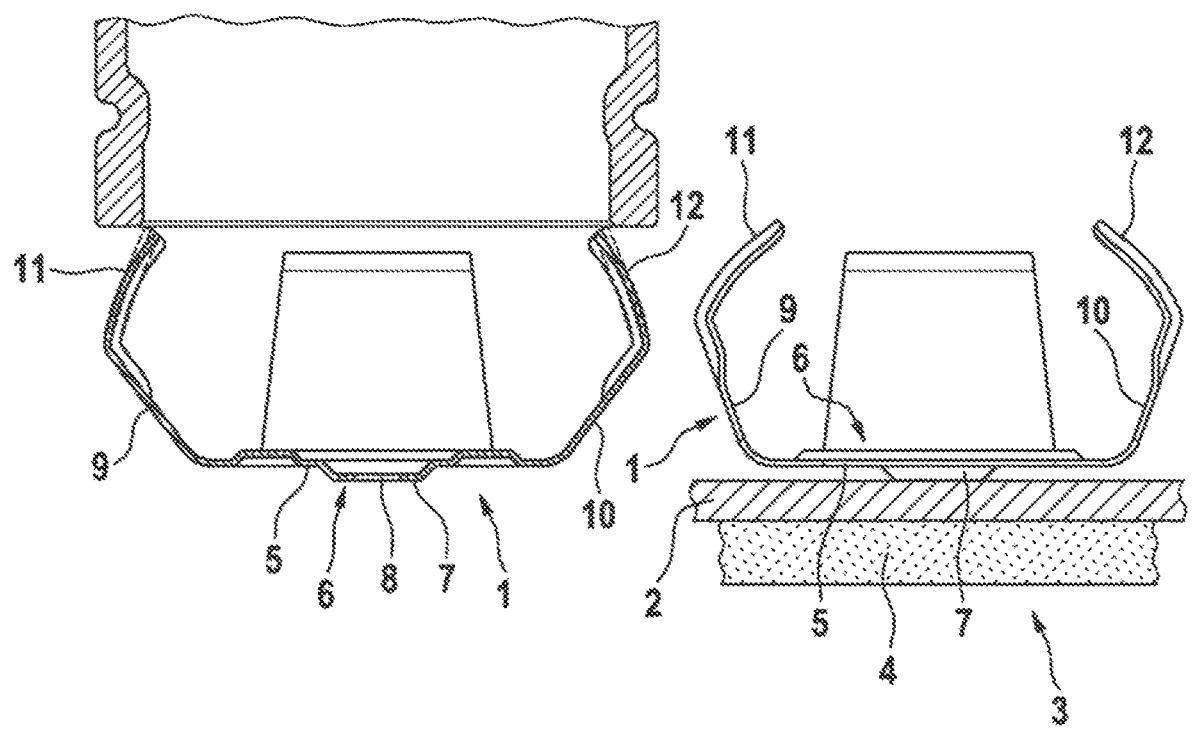
FIG. 3 shows the embodiment according to FIG. 2 on an enlarged scale.
Figure 4:
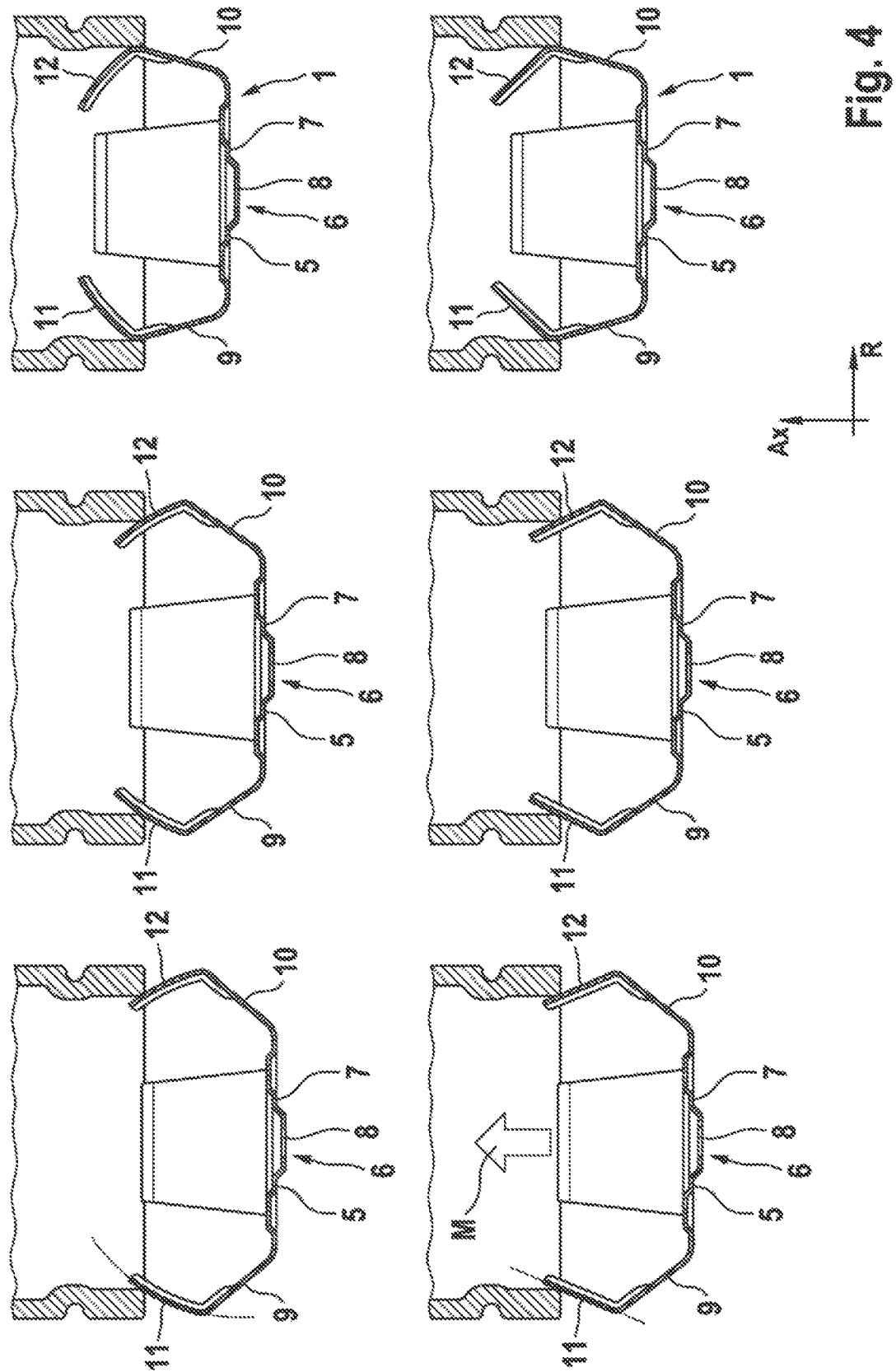
FIG. 4 shows a schematic comparison of a mounting stage sequence a) according to an aspect of the invention (top row of images), b) of the conventional type (bottom row of images)
Figure 5:
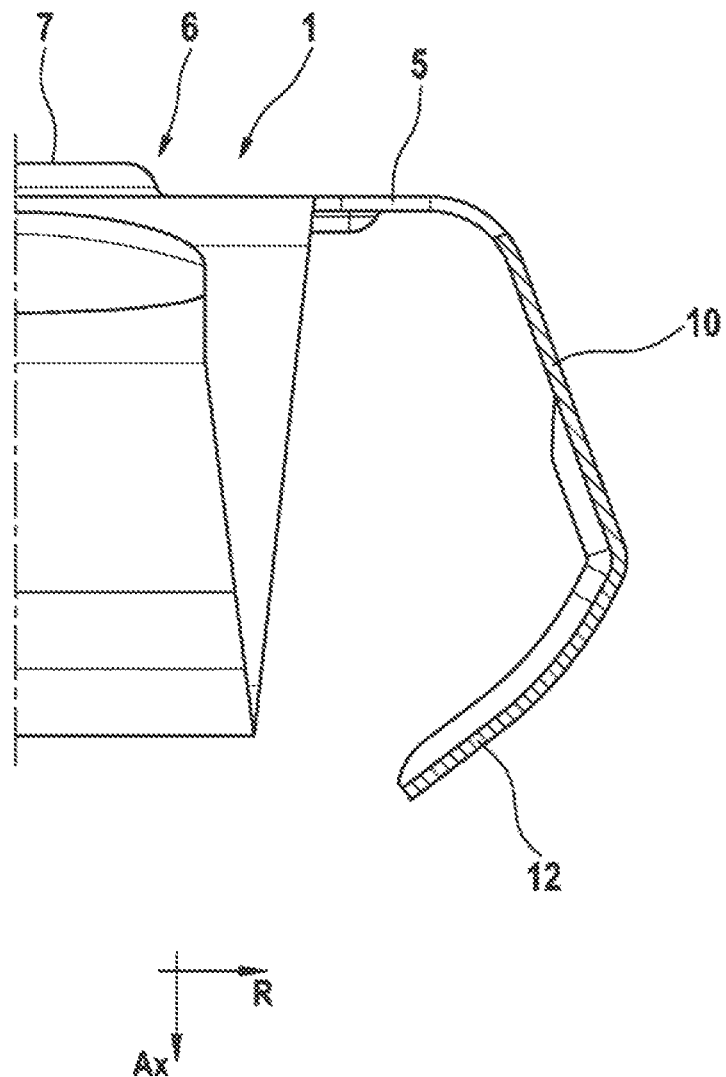
FIG. 5 shows an enlarged partial view of a friction lining holding spring similar to FIG. 3.

A friction lining holding spring 1 is fixed on a rear side of a backplate 2 of a friction lining 3 of a motor vehicle partial-lining disk brake. The front side of the backplate 2 bears a friction material 4. The friction lining holding spring 1 is cut out in one piece from a thin sheet steel material. It comprises a base section 5, which is arranged largely flat and so as to be stiff in bending and has a central fastening tab 6 comprising a cup 7 and a through-opening 8 for the purpose of fixing on the backplate 2. Laterally at the ends of the base section 5 there are in each case two U-spring legs 9, 10, which are arranged symmetrically with respect to one another, are bent in the form of U-shaped yokes and are set in a trapezoidal shape. Both U-spring legs 9, 10 branch off from the base section 5 at an obtuse angle, wherein each U-spring leg 9, 10 ends with a knee piece 11, 12, which is offset again in the same direction. On the far side of their offset point, known knee pieces 11, 12 are rectilinear and flat (FIG. 1).

The proposal is for a knee piece 11, 12 which is curved in itself or offset several times and the spring leg 9, 10 of which thus incorporates a force reduction. In particular, it is possible to incorporate a progressive lever mechanism effect, thus ensuring that the force requirement for push-in mounting is linear. In other words, the friction lining holding spring 1 (or alternatively the actuating member, or both components) contains a curved insertion contour which, as a result, generates a progressive lever mechanism effect. One particular advantage of an embodiment of the present invention is that a specially curved insertion contour avoids an exponential rise in the mounting force requirement by virtue of a lever mechanism transmission ratio of nonlinear configuration.

In other words, an aspect of the present invention allows particularly favorably optimized engagement between the actuating member and the holding spring. In particular, the insertion contour of the knee piece 11, 12 has a degressive curvature.

The curvature of the insertion contour of the knee piece 11, 12 can be configured as a circular arc or can be curved in some other way, depending on the required gearing effect.

Elliptical or involute curvature is possible in principle, depending on the desired reduction effect. A contact angle between the spring arm and the actuating member is changed positively over the mounting travel thereof.

The force requirement for axially directed push-in mounting of the friction lining holding spring 1 in the interior of the actuating member varies continuously over the mounting travel. When the end mounting position is reached, the force requirement is significantly reduced and reaches a reduction of about 35% of the force requirement of a previously known configuration, for example (cf. the comparison according to FIG. 1).

According to an aspect of the invention, it is likewise made possible in principle for the geometry of the insertion contour of the knee piece 11, 12 to comprise multiply offset subsections, that is to say, in principle, subsections of straight configuration and/or angles bent with an offset in several stages, and/or a combination of curvatures with different radii alone and/or in combination with one or more curved and offset subsection(s). The geometry defines the reduction effect in the engagement between the actuating member and the insertion contour.

In modeling the moment of resistance to bending of the U-spring leg or knee piece 9, 10, 11, 12, it is possible, in particular, for this to be modified in sections by providing cross-sectional profiling, profile modification, wall thickness variation, thickening or a through-opening. All the measures can be present individually or linked in any desired combination with one another, even if such a design is not illustrated by the drawing.

One additional usable variation consists in that the material of the U-spring leg 9, 10 or knee piece 11, 12 can be modified in sections, e.g. by introducing cold work hardening in some sections.

A mounting facilitation measure with a direct effect which can in principle be exploited independently of or in addition to gearing effects envisages that a holding spring 1 provided with an anticorrosion coating, the U-spring legs 9, 10 of which or at least the knee piece 11, 12 of which is provided, at least on the outside—i.e. in the direction of the brake piston inner wall—with a special surface treatment. This can include particularly smoothly paired surfaces or a surface coating containing tribologically slip-reducing constituents. Accordingly, an integrated or specially applied antifriction coating reduces the prevailing contact or sliding friction between the brake piston inner wall and the knee piece 11, 12. The smoothing, i.e. brushing direction, polishing or grinding direction, are aligned with the groove direction oriented parallel to the mounting direction M of the lining holding spring 1.

In short, a design configuration according to an aspect of the invention of the holding spring 1 or actuating member includes improved engagement of the mechanism, with an improved engagement angle, wherein the gearing effect with the novel improvement has a very advantageous effect on a reduction of the push-in force requirement for simplified friction lining mounting. Accordingly, an aspect of the present invention comprises a significant relief for a worker.

LIST OF REFERENCE SIGNS

1 Friction lining holding spring
2 Backplate
3 Friction lining
4 Friction material
5 Base section
6 Fastening tab
7 Cup
8 Through-opening
9 Spring leg
10 Spring leg
11 Knee piece
12 Knee piece
M Assembly direction
Ax Axial direction
R Radial direction

The invention claimed is:

1. A friction lining holding spring for a motor vehicle partial-lining disc brake lining, which is cut out in one piece from thin steel sheet material, is bent in the form of a U-shaped yoke, comprising:
   a U base section, which is arranged largely flat and so as to be stiff in bending and has a central fastening tab with a cup and a through-opening for the purpose of fixing on a backplate of a motor vehicle disc brake lining, and
   U-spring legs branching off trapezoidally at an obtuse angle to the base section at each end of the U base section,
   wherein each U-spring leg has a free end, which is designed as an offset knee piece, wherein each knee piece has an uneven insertion trajectory such that, when inserted into the brake piston, there is a predefined reduction in an insertion force.

2. The friction lining holding spring as claimed in claim 1, wherein the free end of each U-spring leg has at least one arc-shaped section to form the insertion trajectory.

3. The friction lining holding spring as claimed in claim 2, wherein the arc-shaped section contains part of a circular arc or part of a curved mathematical function.

4. The friction lining holding spring as claimed in claim 3, wherein the mathematical function is selected from the group consisting of an involute, an ellipse, and an E-function.

5. The friction lining holding spring as claimed in claim 1, wherein the knee piece is angled with multiple sections within itself to form the insertion trajectory.

6. The friction lining holding spring as claimed in claim 5, wherein the knee piece has at least one arc-shaped section to form the insertion trajectory.

7. The friction lining holding spring as claimed in claim 1, wherein a surface treatment comprises a special coating of the friction lining holding spring.

8. The friction lining holding spring as claimed in claim 7, wherein the special coating is an anticorrosion coating of the friction lining holding spring incorporates friction-reducing components, or an anticorrosion coating is provided with an antifriction coating as a separate top coat.

9. The friction lining holding spring as claimed in claim 1, wherein the uneven insertion trajectory is constructed from a plurality of sections of the same order or from a plurality of sections of different orders.

10. The friction lining holding spring as claimed in claim 1, wherein the insertion trajectory has a linear or progressive effect.

11. The friction lining holding spring as claimed in claim 1, wherein each U-spring leg or knee piece has a shape that satisfies a predetermined moment of resistance to bending.

12. The friction lining holding spring as claimed in claim 1, wherein each U-spring leg or knee piece has a material that satisfies a predetermined moment of resistance to bending.

13. The friction lining holding spring as claimed in claim 1, wherein at least one knee piece of a U-spring leg is provided with a surface treatment.

14. The friction lining holding spring as claimed in claim 1, wherein the friction lining holding spring is of substantially smoothed design in a contact zone of the knee piece.

15. A motor vehicle disk brake lining comprising a friction lining holding spring having a knee piece, a U-spring leg and a U base section including a fastening tab, which is fixed on a backplate, wherein the knee piece of the U-spring leg has a insertion trajectory as claimed in claim 1.

16. The friction lining holding spring as claimed in claim 1, wherein the friction lining holding spring is of a substantially brushed, ground or polished design, in a contact zone of the knee piece.

17. The friction lining hold spring as claimed in claim 1, wherein
the U-spring legs are arranged symmetrically with respect to one another.

18. The friction lining hold spring as claimed in claim 1, wherein a curved surface of each knee piece has a differing radius of curvature.

* * * * *